United States Patent Office 2,780,491
Patented Feb. 5, 1957

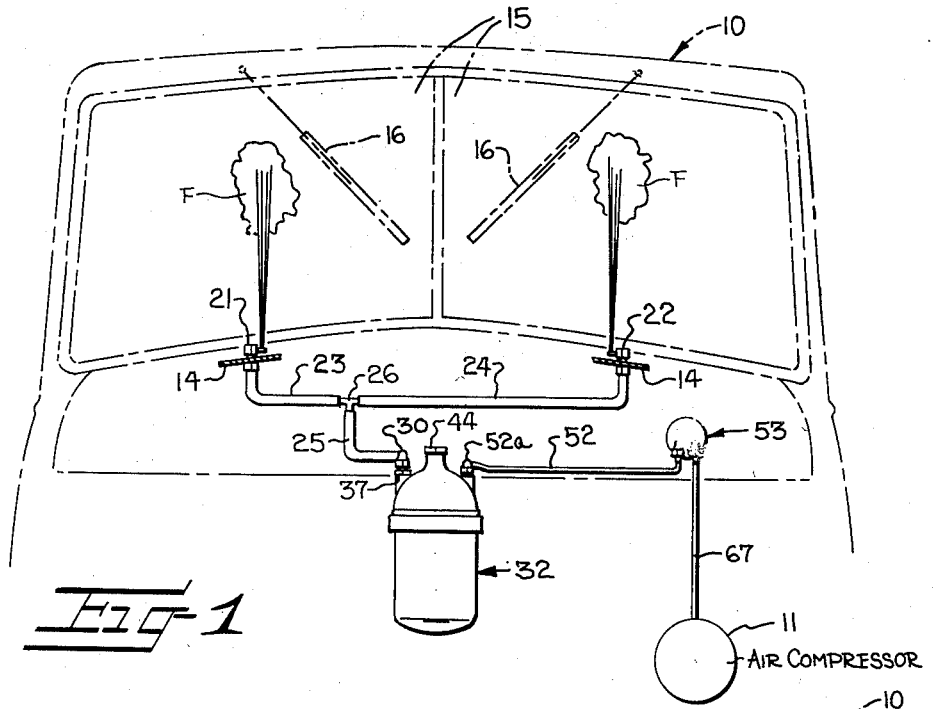
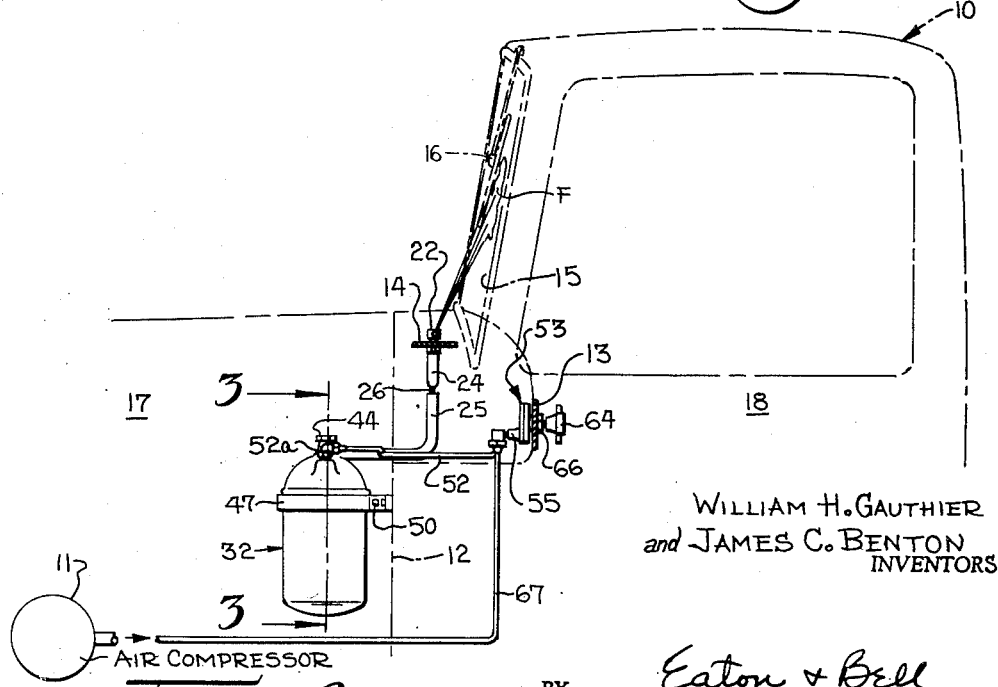

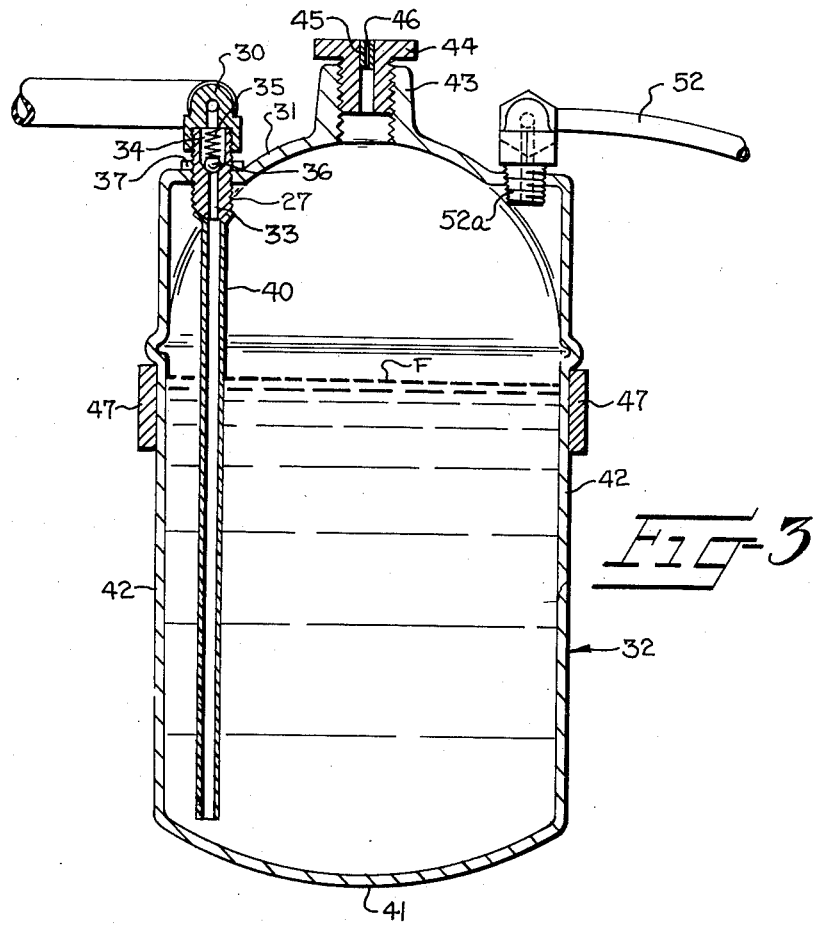
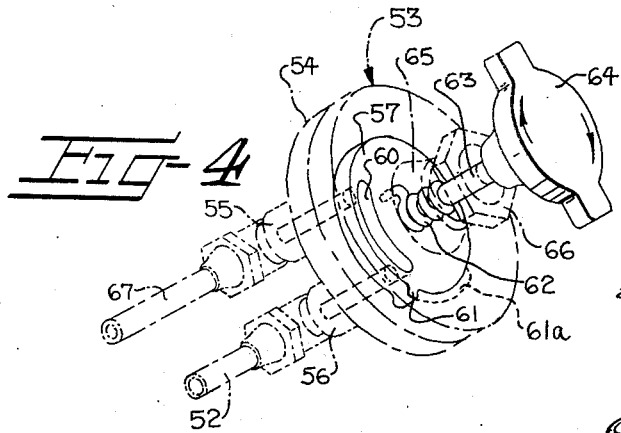
WILLIAM H. GAUTHIER
and JAMES C. BENTON
INVENTORS
BY Eaton + Bell
ATTORNEYS

2,780,491
WINDSHIELD WASHER

William H. Gauthier and James C. Benton, Charlotte, N. C., assignors to Bengau Industries, Inc., Charlotte, N. C., a corporation of North Carolina Application August 24, 1954, Serial No. 451,878

2 Claims. (Cl. 299—58)

This invention relates to windshield cleaning devices for automotive vehicles, and more especially, to an improved system for delivering water or other solvent under pressure to the windshield glass for loosening matter thereon preparatory to removal of such matter by the usual wiper.

It is an object of this invention to provide a device of the character described which is more simple, more efficient, and can be more economically constructed and maintained than similar devices currently employed.

Windshield washers currently in use include means for directing water, solvent and the like from a reservoir or tank to the windshield glass, in some of which a pump is actuated by suction from the manifold of the internal combustion engine of the vehicle and in others of which a constant head pressure is maintained in the reservoir and the flow of the water from the reservoir to the windshield is controlled.

It is another object of this invention to provide a windshield cleaning system which is particularly adapted for use with automotive vehicles of the type having a compressed air system, such as is used for operating the brakes of trucks, busses and the like, and which system is devoid of any moving parts other than a manually operable switch or valve and wherein a reservoir is employed with connections therefrom to nozzles disposed adjacent the windshield glass. The flow of liquid from the reservoir to the nozzles is controlled by the admittance of compressed air into the reservoir under control of the manually operable switch or valve so that there is no head pressure maintained in the reservoir at times when the windshield washer is not in use.

In some systems heretofore in use, the presence of compressed air or the maintenance of a head pressure in the reservoir at times when the system was not being used has required that pressure lines of sufficient size and strength be employed to withstand the constant pressure maintained therein and, in spite of this, the constant pressure maintained in such systems has resulted in leakage of the fluid at the junctures of the various interconnected parts of the system, such as the fittings between the pipes or conduits thereof and the reservoir, the valve structure, the fittings between the conduits and the valve, etc.

More specifically, it is an object of this invention to provide a windshield washer system comprising an enclosed reservoir or tank for containing a supply of liquid, such as water or other solvent, with manually operable means for selectively admitting compressed air into the tank or reservoir for effecting a head pressure therein and also wherein an open-bottomed liquid-inlet pipe or conduit is submerged in the solution and its upper end communicates with a fluid line leading to a nozzle or nozzles disposed adjacent the windshield whereby, upon said head pressure being developed in the tank, any desired amount of fluid may be directed under pressure from the reservoir or tank to be emitted from the nozzles under constant pressure whenever said valve or switch is open.

It is still another object of this invention to provide an apparatus of the type last described wherein the reservoir or tank is provided with a bleeder in its upper portion which permits compressed air to escape from within the reservoir each time the manually operable valve or switch is closed to thereby relieve the system of pressure at times when it is not in use and to afford sharp control of the water streams emitting from the nozzles.

It is still another object of this invention to provide an apparatus of the character last described wherein said reservoir is provided with a safety plug which will be forced out of the wall of the reservoir in the event of admittance of an excessive amount of pressure into the reservoir or tank, such as might rupture the walls of the tank.

Some of the objects of the invention having been stated, other objects will appear as the description proceeds when taken in connection with the accompanying drawings, in which—

Figure 1 is a somewhat schematic view of the improved windshield washer system, showing a portion of the front end of an automotive vehicle in phantom lines in association therewith;

Figure 2 is a schematic view looking at the right-hand side of Figure 1;

Figure 3 is an enlarged vertical sectional view through the reservoir or pressure tank taken substantially along line 3—3 in Figure 2;

Figure 4 is an isometric view of the manually operable valve or switch shown in the right-hand central portion of Figure 2, but wherein the housing thereof is shown in phantom lines.

Referring more specifically to the drawings, the numeral 10 generally designates a truck, bus or any other automotive vehicle which may employ a source of compressed air for any purpose whatsoever, such as for actuating the brakes thereof, the source of compressed air, in this instance, being shown schematically as an air compressor 11. In actual practice the air will normally be delivered from an air reservoir connected to the air compressor. The parts of the improved windshield washer system are positioned relative to a firewall or dashboard 12, an instrument panel 13, a cowl 14 and a windshield 15, which windshield is shown as being of the two-glass type in Figures 1 and 2. The windshield 15 is also provided with the usual windshield wipers 16. The firewall or dashboard 12 defines at its front side an engine compartment 17 and, at its rear side, a driver's compartment 18.

The improved windshield washer system comprises nozzles or spray heads 21 and 22, which may be of conventional or other construction and which are suitably supported on the cowl 14 of the automotive vehicle 10 adjacent and below the windshield 15. The nozzles 21 and 22 are suitably coupled to a pair of tubular members, conduits or pipes 23 and 24, which pipes extend inwardly and are connected to a tube, pipe or conduit 25 by means of a pipe T 26. The conduits 23, 24 and 25 may be made from rigid material, but are preferably flexible or made from rubber or other resilient material, as shown.

The end of conduit 25 remote from the pipe T 26 is connected to a check valve assembly 27 by means of a fitting 30 in the form of a pipe elbow. The housing of the check valve assembly 27 is externally threaded and threadably penetrates the upper wall 31 of a sealed pressure tank or reservoir 32. The check valve assembly 27 may be of any desired construction and it will be observed in Figure 3 that the housing of the check valve assembly 27 has a longitudinally extending bore 33 therethrough and a counterbore or enlarged bore 34 communicating with the upper end of the bore 33. The counterbore or enlarged bore 34 has a compression spring 35 therein which bears against a ball or check valve 36 and normally causes the check valve 36 to seat against the bottom of the large bore 34 to seal the upper end of the bore 33. The upper end of the spring 35 bears against the lower surface of the fitting 30.

The housing of the check valve 27 is locked in the top wall 31 of the pressure tank or reservoir 32 by means of a lock nut 37. Connected to the lower end of the housing of the valve assembly 27, as by welding, is the upper end of a fluid or liquid outlet, or standpipe 40 whose open lower end terminates closely adjacent the bottom 41 of the reservoir or pressure tank 32. It will be noted that the tank 32 is shown as being cylindrical and includes a substantially circular side wall 42 which is connected at its lower edge to the bottom wall 41 and which is connected at its upper end to the top wall 31, said top wall 31 being substantially hemispherical in Figure 3.

Although the tank or reservoir 32 is shown as being substantially cylindrically-shaped in Figures 1, 2 and 3, it is to be understood that this tank 32 may be of any desired shape. The tank 32 is adapted to contain a supply of water, liquid, solvent, or any other suitable window cleaning fluid F. In order to permit the introduction of fluid into the tank 32, it will be observed in Figure 4 that the upper portion of the top wall 31 is provided with a tubular projection 43 thereon which is internally threaded for reception of a tubular fitting or cap 44 which may be temporarily removed from the tank 32 for introducing fluid therein. The fitting 44 has an escapement plug or bleeder fitting 45 pressed therein under predetermined pressure, which escapement plug is provided with a relatively small bleeder hole 46 which communicates with the atmosphere for exhausting compressed air from the tank 32 following each operation of the washer system.

The tank or reservoir 32 may be supported in any desired manner, and in this instance, a strap member or bracket 47 substantially surrounds the medial portion of the cylindrical wall 42 of the tank 32 and it is clamped therearound, as by a bolt 50 in Figure 2. The strap member 47 is flared outwardly at opposite ends thereof and suitably secured to the firewall 12 within the engine compartment 17.

It will be observed in Figures 1, 2 and 3 that the upper wall 31 of the reservoir or tank 32 also has one end of a pipe, conduit or tube 52 communicatively connected thereto above the normal level of the liquid F as by a pipe fitting or elbow 52a. The other end of the pipe 52 is connected to one side of a suitable manually operable switch or valve assembly broadly designated at 53. The valve assembly 53 may be of any desired or conventional construction and is preferably of a type which may be opened manually and will automatically close upon being released.

By way of illustration, a valve suitable for this purpose is shown somewhat schematically in Figure 4 wherein it will be noted that the valve assembly 53 is rotated in Figure 4 relative to the positions in which it is shown in Figures 1 and 2 so the bottom of the housing 54 thereof in Figure 4 is nearest the observer. The valve housing 54 is provided with inlet and outlet tubular portions 55 and 56, the pipe or conduit 52 being communicatively connected to the tubular outlet 56. Rotatable in the housing 54 is a substantially circular valve member 57 which is provided with an arcuate slot or passageway 60 in one side portion thereof and which also has an abutment or projection 61 on the periphery thereof. The projection 61 is movable in an arcuate groove 61a in housing 54 whose opposite ends limit movement of the valve member in either direction. The valve member 57 is normally urged to closed position, where the abutment 61 engages the right-hand end wall of groove 61a, by a torsion spring 62 which surrounds a valve stem 63 whose inner end is fixed to the valve member 57 and whose outer end has a suitable knob 64 fixed thereon.

It will be noted that the valve housing 54 has a reduced portion 65 integral therewith which penetrates the dashboard or instrument panel 13 and is fixed therein, as by a lock nut 66. One end of the torsion spring 62 is connected to the valve member 57 and its other end is connected to the portion 65 of the valve housing 54. The stem 63 of the valve member 57 is rotatably mounted in the portion 65 of the housing 54.

When the knob 64 is released by the operator, it is apparent that the torsion spring 62 will rotate the valve member 57, stem or shaft 63 and knob 64 in a counter-clockwise direction in Figure 4 to thereby move the passageway 60 out of register with the tubular inlet 55. On the other hand, when the operator turns the knob in a clockwise direction in Figure 4, the passageway 60 then registers with both the inlet and outlet portions 55 and 56 to permit compressed air to pass through the valve assembly 53 and thus through the pipe 52 into the reservoir or pressure tank 32 to create a head pressure therein above the fluid F.

The inlet portion 55 of the valve housing 54 has one end of a pipe or conduit 67 communicatively connected thereto, whose other end is connected to the air compressor 11 heretofore described. The valve 53 is a commercially available product and has an adjustable regulator, not shown, incorporated therein, if desired, in the alternative, a suitable pressure regulator valve may be interposed in the air inlet conduit 67.

Although the bleeder hole 46 is shown in the plug 45, it is contemplated that the bleeder hole may be formed in the top wall 31 or the upper portion of side wall 42 above the maximum fluid level, if desired. Also, the plug 45 could then be devoid of a bleeder hole therein and it could also be pressed into a hole provided therefor in the top wall 31 or side wall 42. In the latter instance, the filler cap 44 would be solid. The bleeder hole 46 should be sufficiently small so the valve 36 is readily unseated by the fluid upon compressed air being admitted into the tank 32.

*Method of operation*

It is apparent that, when the valve member 57 is closed, compressed air is present in the inlet pipe 67 only and there is no pressure in any of the conduits or any other parts of the system from the valve assembly 53 to the nozzles 21 and 22. When the valve assembly 53 is opened, in the manner heretofore described, compressed air then flows from the air compressor through the pipe or conduit 67, through the valve assembly 53, through pipe 52 and fitting 52a into the upper portion of the tank or reservoir 32, thereby creating a head pressure therein above the fluid F. It is apparent, that when the head pressure is developed, the fluid is then placed under pressure and is forced upwardly into and through the fluid outlet or standpipe 40 and through the bore 33 in the check valve assembly 27.

Of course, the pressure of the fluid displaces the check valve 36 and, thus, the fluid is directed to and ejected from the nozzles 21 and 22 under constant pressure as long as the valve assembly 53 is open. It should be noted that a system constructed according to the present invention is particularly valuable when used on trucks, busses and the like having relatively large windshields, since the pressure of the fluid as it is ejected from the nozzles 21 and 22 may be sufficient to insure that the spray of fluid is directed to the uppermost extremities of the windshield glass.

Now, while the valve assembly 53 is open and when the valve knob 64 is released by the operator, permitting the valve assembly 53 to close, the compressed air within the tank 32 is permitted to escape at a relatively slow rate through the bleeder opening 46 in the plug 45 thus relieving all of the various parts of the improved system from pressure in excess of normal atmospheric pressure and thereby preventing leakage at the junctures of the various interconnected parts of the system. The valve 36 is provided to prevent fluid within the conduits 23, 24 and 25 from flowing back into the tank or reservoir 32, by gravity, as the head pressure within the tank 32 is relieved, thereby insuring instantaneous emission of fluid from the jets or nozzles 21, 22 upon the valve assembly 53 being manually opened.

Although the bleeder opening 46 may be provided in the fitting 44 or in the top wall 31 of the reservoir or tank 32, in lieu of providing the plug 45, the plug 45 is provided to insure that the head pressure within the reservoir or tank 32 will never exceed safe limits, thereby insuring that the various parts of the system, and particularly the tank 32, cannot be ruptured by excessive pressure therein. In the event of a pressure above a predetermined amount becoming present in the tank 32, the plug 45 will then be forced out of the fitting 44 to thereby permit the compressed air to rapidly escape from within the tank or reservoir 32. The bleeder opening 46 also permits sharp control of the water stream. As soon as the valve 53 is released, pressure will dissipate through the bleeder 46 and the water stream will stop almost instantaneously.

It is thus seen that I have provided a simple and efficient windshield washing apparatus which may be economically constructed and maintained, which has no moving parts other than the movable parts of the valve assembly 53 and which can be readily serviced merely by removing the fitting 44 for introducing fluid into the tank or reservoir 32.

It should also be noted that the entire system can be easily cleaned merely by opening the core or valve member 57 of the valve assembly 53 when the supply of fluid in the reservoir 32 has been exhausted so that compressed air will then be discharged or emitted from the nozzles 21 and 22. Also, the fitting or cap 44 may be removed so that any detrimental matter which may be present in the then empty tank 32 will be discharged from the tank through the tubular projection 43 by compressed air.

It is well known that most automotive vehicles which utilize a compressed air system for actuating the brakes thereof are usually provided with a pressure tank for containing compressed air which is present although the engine of the vehicle may not be running and it follows, therefore, that the improved windshield washer system may be operated although the engine of the vehicle is not running.

Among other features of the invention, the following should be noted:

(1) The flow of air rather than the flow of water is controlled by the valve assembly 53.

(2) The volume of water emitted from the nozzles can be varied by increasing or decreasing the size of the openings in the nozzles.

(3) The pressure of the compressed air may be controlled by adjustment of the regulator valve.

(4) The pressure of the water emitted from the nozzles 21 and 22 may be varied by varying the size of the bleeder opening 46 in the plug 45.

In the drawings and specification there has been set forth a preferred embodiment of the invention and, although specific terms are employed, they are used in a generic and descriptive sense only and not for purposes of limitation, the scope of the invention being defined in the claims.

We claim:

1. A window washer for use with a source of compressed air, said window washer comprising at least one nozzle, a reservoir having an air space in its upper portion and a supply of liquid in its lower portion, first conduit means connecting the lower portion of the reservoir with said nozzle, a second conduit means connecting the upper portion of said reservoir with said source of compressed air, normally closed manually operable valve means interposed in said second conduit means to normally prevent compressed air from entering said reservoir, said valve means being operable to admit compressed air into the reservoir to build up head pressure in its upper portion to cause liquid within the reservoir to pass therefrom through the first conduit means and through the nozzle, a bleeder element frictionally retained in the upper portion of said reservoir and having an aperture therein of relatively smaller size than said conduits to thereby permit build-up of predetermined head pressure when the valve is opened and to relieve the first conduit means and the reservoir from pressure in excess of atmospheric pressure when the valve is closed, and said bleeder element being frictionally retained to the extent that it will be forced out of engagement with said reservoir upon the pressure in said reservoir exceeding a predetermined amount.

2. A window washer for use with a source of compressed air, said window washer comprising at least one nozzle, a reservoir having an air space and a supply of liquid, first conduit means connecting the liquid supply in the reservoir with said nozzle, a second conduit means connecting the air space within said reservoir with said source of compressed air, normally closed valve means interposed in said second conduit means to normally prevent compressed air from entering said reservoir, said valve means being operable to admit compressed air into the reservoir to build up head pressure therein to cause liquid within the reservoir to pass therefrom through the first conduit means and through the nozzle, a bleeder element communicatively connected with said second conduit and having an aperture therein of relatively smaller size than said conduits to thereby permit build-up of predetermined head pressure when the valve is opened and to relieve the reservoir from pressure in excess of atmospheric pressure when the valve is closed.

References Cited in the file of this patent

UNITED STATES PATENTS

| | | |
|---|---|---|
| 2,001,338 | Wiseman | May 14, 1935 |
| 2,114,558 | Dismukes | Apr. 19, 1938 |
| 2,540,290 | Rappl | Feb. 6, 1951 |
| 2,594,437 | Horton | Apr. 29, 1952 |